United States Patent [19]
Engel et al.

[11] Patent Number: 5,875,439
[45] Date of Patent: Feb. 23, 1999

[54] NONRECURRENT BINARY CODE RECOGNIZER

[75] Inventors: Stephen Joseph Engel, East Northport, N.Y.; Clark Jeffries, Clemson, S.C.

[73] Assignee: Northrop Grumman Corporation, Los Angeles, Calif.

[21] Appl. No.: 884,279

[22] Filed: Jun. 26, 1997

Related U.S. Application Data

[63] Continuation-in-part of Ser. No. 348,564, Dec. 2, 1994, Pat. No. 5,666,468.

[51] Int. Cl.$^6$ ..................................................... G06F 15/18
[52] U.S. Cl. .............................. 706/41; 706/22; 706/26; 706/36; 706/38
[58] Field of Search ................................. 706/41, 26, 36, 706/22, 38

[56] References Cited

U.S. PATENT DOCUMENTS

| | | | |
|---|---|---|---|
| 3,742,144 | 6/1973 | Brandenburg et al. | 179/15 |
| 4,276,647 | 6/1981 | Thacker et al. | 371/40 |
| 4,648,091 | 3/1987 | Gajjar | 371/37 |
| 4,811,361 | 3/1989 | Bacou et al. | 375/25 |
| 4,980,897 | 12/1990 | Decker et al. | 375/38 |
| 5,081,626 | 1/1992 | Scott | 371/22.4 |
| 5,195,098 | 3/1993 | Johnson et al. | 371/37.2 |
| 5,233,629 | 8/1993 | Paik et al. | 375/39 |
| 5,278,845 | 1/1994 | Reintjes et al. | 371/37.1 |
| 5,448,592 | 9/1995 | Williams et al. | 375/263 |
| 5,473,731 | 12/1995 | Seligson | 706/20 |
| 5,504,758 | 4/1996 | Inoue et al. | 371/37.1 |

OTHER PUBLICATIONS

Jeffries, C. et al., "High Order Neural Network Models for Error Correcting Code", Conference Proceedings of the Society of Photooptical Instrumentation Engineers, Orlando, Florida, Mar. 1990.

Carlson, R. et al. "Efficient Recognition with High Order Neural Networks", Conference Proceedings of the Society of Photooptical Instrumentation Engineers–1469, Orlando, Florida, Apr. 1991.

Jeffries, C., "Code Recognition with Neural Network Dynamical Systems", Society for Industrial and Applied Mathematics, vol. 32, No. 4, pp. 636–651, Dec. 1990.

*Primary Examiner*—George B. Davis
*Attorney, Agent, or Firm*—Terry J. Anderson; Karl J. Hoch, Jr.

[57] ABSTRACT

A nonrecurrent version of the Neural Network Binary Code Recognizer is disclosed. This Nonrecurrent Binary Code Recognizer, which decodes an input vector of n analog components into a decoded binary word of n bits, comprises an analog-to-digital converter, an inverter circuit, a digital summing circuit and a comparator circuit.

20 Claims, 8 Drawing Sheets

Fig. 1
(PRIOR ART)

Fig. 2  NNBCR PROGRAMMED FOR VALID CODES 1,0 AND 0,1

GAIN FUNCTION $g(X_i)$

Fig. 3

EXAMPLE TRAJECTORY

DISCRETE GAIN FUNCTION

*Fig. 7*

SUMMING CIRCUIT OF THE NBCR

Fig. 10

NONRECURRENT BINARY CODE RECOGNIZER

RELATED APPLICATIONS

This is a continuation-in-part application of U.S. patent application Ser. No. 08/348,564 filed on Dec. 2, 1994, U.S. Pat. No. 5,666,468.

FIELD OF THE INVENTION

The present invention relates generally to an apparatus that provides error correction for encoded digital communications. More particularly, the invention is a combination of analog and digital components which operates directly on noisy incoming signals without rounding the signals first, for reliably achieving error correction of conventionally encoded digital communications with significantly lower error rates.

BACKGROUND OF THE INVENTION

The use of error-correcting codes for the reliable transmission of digital information is commonplace in most communication systems. One conventional way to achieve an error-correction capability is to add certain number of extra bits to the actual information bits in a way that maximizes the Hamming distance between the code words. The resulting minimum Hamming distance "d" of such a (binary) block code, which is the minimum number of bits in which all pairs of words differ, is a key property of the code. Specifically, a code is capable of correcting up to "t" errors in any received word if $d \geq 2t+1$. For example, in a Hamming (7,4) code, the number of information bits is 4 and the number of transmitted bits is 7. The extra transmitted bits allow the separation between the $2^4$ possible meaningful data so that if some of the bits are corrupted, the result will not be too far away from the original to be found. In the Hamming (7,4) code, the minimum distance between meaningful data is 3 so that all pairs of transmitted codes differ by at least three bits. If one bit is corrupted during transmission, it is still easy to recover the original by finding the closest match (nearest Euclidean or Hamming neighbor) in a table of valid codes.

Another popular error correction code is the Hadamard nonlinear code where the distance between the codes is larger and thus has a greater corruption resistance.

Presently, to achieve decoding and possible error-correction of these types of codes, a "hard-decision" type decoding technique utilizing conventional, linear algebraic decoding algorithms may be employed. This technique requires a thresholding of the incoming noisy, analog signal in order to obtain binary values of the incoming signal. Specifically, the thresholding technique requires that each of the bits in the received string of "n" bits be rounded to a 1 or 0, before any decoding algorithm is used. In the process of rounding, some potentially useful information about the original string is lost.

A "soft-decision" type decoding technique operates with the incoming signal directly by accepting a vector of real values outputted from the noisy channel and estimating the vector of symbols that were transmitted through the noisy channel. Soft-decision decoding techniques result in improved error-correction capability. It is now well known that soft-decision decoding techniques can provide approximately 2 decibels more coding gain for a white Gaussian channel, i.e., a channel with additive white Gaussian noise. Other types of coding techniques, such as convolutional codes, which are based on a different principle than block codes, can be combined with decoding techniques that allow soft-decision decoding. However, those techniques involve increased computational complexity that is prohibitive for certain applications.

As discussed in the article entitled "Code Recognition with Neural Network Dynamical Systems" by C. Jeffries, Society for Industrial and Applied Mathematics Review, Volume 32, No. 4, December 1990, a class of dynamical systems called neural networks can serve as a fully analog computer to simulate some aspect of cognition. More specifically, one type of mathematical neural network model is an n-dimensional difference equation or differential equation dynamical system that accounts for the dynamics of n neurons. Each neuron is mathematically a state $x_i$ (a real number) with an associated output $g_i=g_i(x_i)$, typically a ramp or sigmoidal gain function $g_i(x_i)$. The time rate of change of $x_i$ is determined by a system function dependent on $x_i$ itself and the outputs of $g_i(x_i)$. Thus, the purpose of the model is to exhibit dynamics analogous to image recognition, learning, limb control, or some other function of a central nervous system.

In the context of code recognition and error correction of data, a neural network can be used to simulate memory retrieval. As discussed in the C. Jeffries article, the time evolution of a trajectory of such a system is mathematical "recognition", meaning convergence to one of several "attractors" referred to as mathematical memories. The attractors are prespecified constant trajectories or limit cycles and mathematical recognition amounts to regarding an input binomial n-string with component values ranging from +/−1 as an initial state of trajectory, and observing the subsequent convergence of that trajectory to one of the memories. A model with such dynamics is said to have "content-addressable memory" because partial or imperfect knowledge of a memory leads to complete retrieval of the memory through system dynamics. Thus, the principle of operation of content-addressable memories is pattern completion or pattern correction, that is, the retrieval of a stored pattern that best fits an input pattern which is distorted or contains incomplete information. This is equivalent to decoding error-correcting binary codes if the code words are memories stored in the neural network and the inputs to the network are the analog estimates of data transmitted over a noisy channel. After presentation of this analog vector representing an initial value, the neural network as a dynamical system should then ideally converge to the closest attractor and produce the stored code word at its output, thus, performing soft-decision decoding.

For a successful application of a neural network to perform as a content-addressable memory, the neural network has to be capable of storing arbitrary words, and it has to be guaranteed that the stored words represent the only stable attractors of the memory. The limited success in using neural networks for this application can be attributed to the limitations of current models, which do not allow the storage of arbitrary words, have a limited memory capacity, and cannot guarantee that the stored patterns constitute the only attractors of the dynamical system.

Other disadvantages include the large number of electronic devices that must be included in order to provide error correction of larger encoded data words and the difficulty in implementing such a neural network in a monolithic chip.

SUMMARY OF THE INVENTION

It is an object of the instant invention to provide a neural network binary code recognizer that implements a high order neural network memory model for providing error correction of encoded digital communications.

It is another object of the instant invention to provide a neural network binary code recognizer that implements a high order neural network memory model utilizing constant attractors that can store using n neurons any arbitrary number M, $1 \leq M \leq 2^n$, of any binomial n-strings as constant attractor memories.

It is yet another object of the instant invention to include a minimum operator means in a neural network binary code recognizer that reduces the amount of processing circuitry and further accelerates the binary code recognition process.

It is yet a further object of the present invention to provide a neural network binary code recognizer that provides soft-decision decoding with any block code.

It is still a further object of the present invention to provide a neural network binary code recognizer that implements a dynamic system that is guaranteed to converge to stable attractors or indicate that a decision cannot be made when given arbitrary analog values as initial input.

It is still another object of the present invention to provide a neural network binary code recognizer that can error-correct noisy binary code arriving in non-binary form without first rounding signal digits to zero or 1 (in x-space, for e.g.) and, without implementing conventional serial decoding algorithms.

It is yet still another object of the present invention to provide a neural network binary code recognizer that implements a high order neural network memory model that can achieve one to three orders of magnitude fewer errors compared to conventional serial decoders which first rounds signals to binary values.

These and other objects of the invention are achieved with a neural network binary code recognizer for decoding corrupted n-bit digital code words. Specifically, the binary code recognizer comprises a means for inputting n analog signals into said recognizer, each of the n analog signals representing a bit value of a n-bit digital code word. The recognizer also includes n amplifier means each for storing a respective bit of one or more predetermined valid n-bit binary coded words, each said amplifier means having one or more inputs for receiving a respective said analog signal, and, one or more outputs, each said n amplifier means generating an output signal at said one or more outputs. A means for generating an image product for each of said one or more predetermined valid n-bit binary code words is also provided, each image product comprising the product of one of said one or more output signals for each said n amplifier means in accordance with a stored bit value of each respective amplifier means. Additionally, a feedback means is provided for connecting each said generated image products with one of said one or more inputs of each said amplifier means in accordance with said stored bit value of each respective amplifier means to enable each output signal of each respective amplifier means to dynamically approach its respective stored bit value to form said predetermined valid n-bit binary code word.

Nonrecurrent Binary Code Recognizer

A nonrecurrent version of the Neural Network Binary Code Recognizer (NNBCR) can be implemented as a combination of analog and digital components. This implementation is called Nonrecurrent Binary Code Recognizer (NBCR). The NBCR decodes an input vector of n analog components into a decoded binary word of n bits. The decoded binary word of n bits must be from a list of m predetermined valid binary words. Specifically, the NBCR comprises an analog-to-digital converter, an inverter circuit, a digital summing circuit and a comparator circuit. The analog-to-digital converter transforms the input vector of n analog components into an ordered set of n digital values of a gain function which provides a quantization of the n analog components. The inverter circuit, in electrical communication with the analog-to-digital converter, transforms the ordered set $\{g_i, i=1, \ldots, n\}$ of the n digital values of the gain function into an ordered set of n Boolean complements of the n digital values of the gain function, i.e., the set $\{1-g_i, i=1, \ldots, n\}$. The digital summing circuit, in electrical communication with the analog-to-digital converter and with the inverter circuit, combines according to a formula selected elements from the group consisting of elements of $\{g_i, i=1, \ldots, n\}$, the ordered set of the n digital values of the gain function, and of elements of $\{1-g_i, i=1, \ldots, n\}$, the ordered set of the n Boolean complements of the n digital values of the gain function, into m code patterns which correspond to the m distinct predetermined valid binary words of n bits. The formula for forming a code pattern is as follows: selecting element $g_i$ of $\{g_i, i=1, \ldots, n\}$ if a corresponding bit at position i in a predetermined valid binary word is one and selecting element $1-g_i$ of $\{1-g_i, i=1, \ldots, n\}$ if a corresponding bit at position i in a predetermined valid binary word is zero. The digital summing circuit adds elements in each of the m code patterns to form a sum value for each code pattern. There are m sum values corresponding to the m code patterns. The comparator circuit, in electrical communication with the digital summing circuit, compares the m sum values with each other and determines the largest sum value. The code pattern which results in the largest sum value corresponds to the decoded binary word of n bits.

For each input vector of n analog components which is a transmitted binary word of n bits distorted by additive white Gaussian noise in the channel of communications, the NBCR recovers the transmitted binary word of n bits by finding the closest match, i.e., the Euclidean nearest neighbor, in a set of valid codes, in only one time step. In simulation, as presently determined, with the conversion accuracy of the analog-to-digital converter set at 4-bit, the NBCR reaches decisions which approach Euclidean nearest neighbors for the Hamming (7,4) code. As such, the NBCR decoding accuracy in recovering binary words distorted by additive white Gaussian noise can be ten to one hundred times better than a conventional hard decision decoder. In the case of Reed-Solomon codes, as presently determined, the NBCR reaches decisions which approach Euclidean nearest neighbors where, at certain noise levels, conventional hard decision decoders cannot reach any decision.

DETAILED DESCRIPTION OF THE PREFERRED EMBODIMENTS

The neural network binary code recognizer is an analog device that implements a high-order neural network memory model. It is essentially an analog computer in the form of an n-dimensional dynamical system operating in continuous space with solutions of a problem represented as prespecified constant attractor trajectories (stable equilibria). The mathematical theory of the memory model is given in the C. Jeffries article, mentioned above.

Specifically, each neuron is governed by the differential equation (1) in which it is possible to store any combination of the $2^n$ possible memories, even all $2^n$:

$$\frac{dx_i}{dt} = -x_i + \sum_{l=i}^{M} (2ml_i - 1) Il \quad (1)$$

where, $$Il = \prod_{j=1}^{n} \{ml_j g_j(x_j) + (1 - ml_j)(1 - g_j(x_j))\} \quad (2)$$

and, $$g(x_j) = 0 \text{ if } x_j \leq -e \quad (3)(a)$$
$$1 \text{ if } x_j \geq e,$$
$$\frac{x_j}{2e} + \frac{1}{2} \text{ if } -e < x_j < e$$

Figure 3:
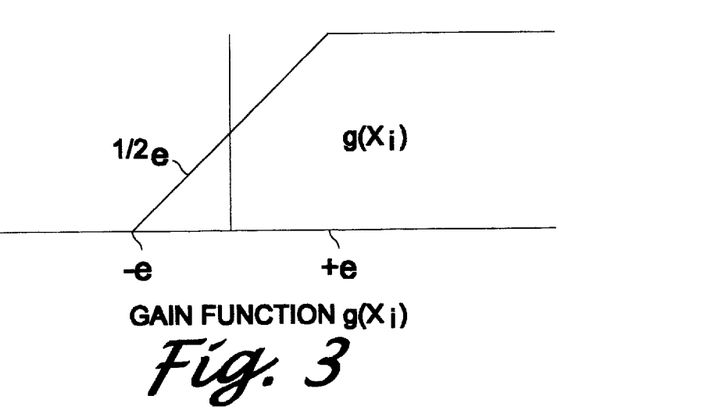
FIG. 3 illustrates the gain function for each neuron (amplifier), $g(x_i)$, in the transition region bounded by $-e, +e$.

As mentioned above, $x_j$ is the internal state of the neuron and $g(x_j)$ is the activation function (neuron output). The slope of the gain function at 0 is denoted $(2e)^{-1}$ and is the gain of the amplifier as illustrated in FIG. 3. The activation function $g(x_j)$ may also be a sigmoidal input/output relation having a relation similar to that obtained by equation (3)(b).

$$g(x_j) = \frac{1}{2} \left[ 1 + \tanh\left(\frac{x_j}{2e}\right) \right] \quad (3)(b)$$

The $ml_j$, where $l=1, \ldots, M$ and $j=1, \ldots, n$ are of values $ml_j=1$ or $0$, and constitute the M valid codes or stored memories (each of n bits). In mathematical terms, ml is stored as a constant trajectory $x_j$ for equation (1) above if $g_j(x_j)=ml_j$ for $j=1, 2, \ldots, n$. Neural networks used in content addressable memory or pattern recognition have only constant trajectories corresponding to memories as attractors. The transition zone, $T_e$, is that portion of state space in which at least one amplifier is in transition (some $g_i$ is between 0 and 1) as shown in FIG. 3 and explained in further detail below. Thus, each I is turned on (=1) in exactly one orthant and turned off (=0) in all others.

The high-order neural network memory model is characterized as using in its system function sums of products of neuron outputs called the image products Il. There is an image product for each of the M valid code words. For example, if n=4 and ml=(0,1,0,1), then $I_l=(1-g_1)g_2(1-g_3)g_4$ as defined by equation 2.

It takes n neurons to construct the system. Each of the n neurons is initialized with the nth bit in the received string and then they evolve with time to a stable state that corresponds to the nearest ml.

Figure 1:
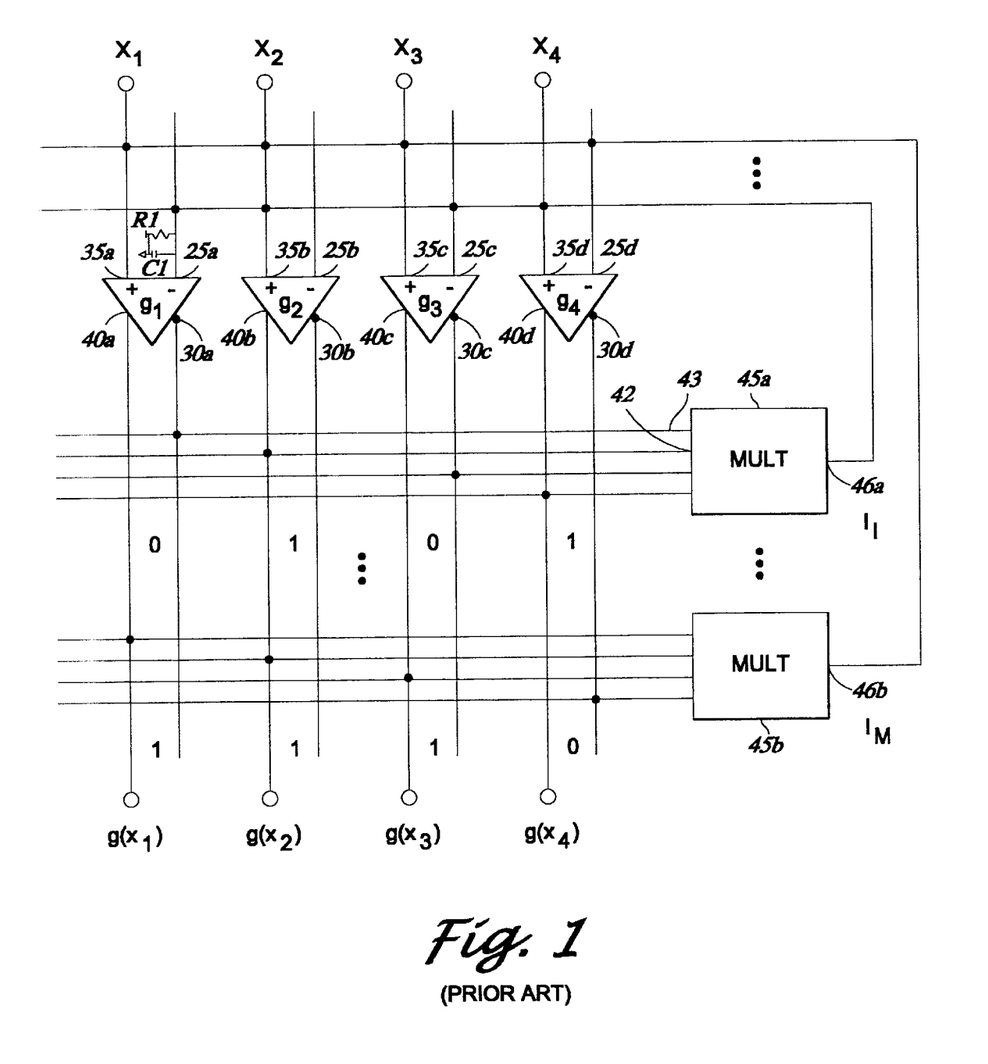
FIG. 1 is a generalized schematic diagram for the high order associative memory with connectivity for the exemplary storage of two bit patterns.

FIG. 1 shows a generalized architecture of an autoassociative high order neural network in the form of a schematic block diagram for a 4-neuron system with connectivity for the storage of two 4-bit memory patterns i.e., 4-bit binary codes (0,1,0,1) and (1,1,1,0). Two different types of units are employed. The units $g_i$, $i=1, \ldots, 4$ are common nonlinear amplifiers having finite gain and a continuous input-output relation, which can be either a linear threshold, as shown in FIG. 3, a sigmoidal function or any other bounded monotonic increasing function (not shown). Each of the amplifiers have an inverted input 25a,b,c,d, (marked by the minus sign) and an inverted output marked by the black dots 30a,b,c,d, in addition to the standard (non-inverted) inputs 35a,b,c,d and non-inverting outputs 40a,b,c,d. The inverted inputs and outputs are used for internal feedback connections only. The inputs $x_i$ can take arbitrary analog values, whereas the continuous outputs $g(x_i)$, $i=1, \ldots, 4$ are bounded between 0 and 1. The second type of units are multiplier devices 45a,b which performs a multiplication of all its n inputs and produces the result at its respective output 46a,b.

The exemplary circuit in FIG. 1 with n=4 amplifiers allows the storage of binary patterns of length n. The patterns or words to be stored in the associative memory are denoted by $\{m_l\}$, $l=1, \ldots, M$, with the components (bits) $M_{li}=0$ or 1, for $i=1, \ldots n$. The storage of each word m requires a feedback loop employing one multiplier device. A particular word $\{m_l\}$ is "stored" in the network by connecting the inputs of a multiplier to the outputs of the amplifiers in a way that forms an image product $I_l$ as described above in equations (2) and (3)(a). The storage of word $m_1$=(0,1,0, 1), for example, requires the connectivity shown in FIG. 1 to compute the image product $I_1=(1-g_1)g_2(1-g_3)g_4$. Since the $g_i$ are bounded between 0 and 1, each Il satisfies $0 \leq Il \leq 1$. In order to store a bit $ml_i$=1, a connection is made between a non-inverting output of amplifier $g_i$ (for e.g., output 40b of amplifier $g_2$) and one input 42 of multiplier 45a, whereas, a bit $ml_i$=0 requires a connection from an inverting output of amplifier $g_1$ (for e.g., output 30a of amplifier $g_1$) and an input 43 of multiplier 45a. The output of a multiplier with the image product Il is fed back to the inputs by making a connection to the inverted input of amplifier $g_i$ (for e.g., input 25a of amplifier $g_1$), if $ml_i$=0, and, a connection to the non-inverted input of amplifier $g_i$, (for e.g., input 35b of amplifier $g_i$, (for e.g., input 35 of amplifier $g_2$), if $ml_i$=1. All the connections, which are represented by black squares in FIG. 1, have the same weight values. Thus, the storage of information does not require a learning algorithm. Instead, the bit-patterns are explicitly hard-wired into the network by using a feedback loop including one multiplier for each word stored in memory.

Each amplifier will contain a capacitor element and resistance, or equivalents thereof, for determining the time-constant for the physical realization of the network. Only one amplifier $g_1$ is shown in FIG. 1 as having such elements R1 and C1. Without loss of generality, those terms equal 1, which results in the equations of motion describing the time evolution of the system described in equation (1) above. The term $(2ml_i-1)$ describes the connection of a particular feedback loop to either the non-inverting or the inverting input of amplifier $g_i$ depending on the bit-value $ml_i$. By substituting Il from equation (2) in equation (1), the high order character of the dynamical system caused by the product terms for an $ml_i$=(0,1,0,1), becomes as follows:

$$dx_1/dt = -x_1 - (1-g_1)g_2(1-g_3)g_4 \qquad (4)$$

$$dx_2/dt = -x_2 + (1-g_1)g_2(1-g_3)g_4$$

$$dx_3/dt = -x_3 - (1-g_1)g_2(1-g_3)g_4$$

$$dx_4/dt = -x_4 + (1-g_1)g_2(1-g_3)g_4$$

By inspection, the only constant trajectory for the system of FIG. 1 with $g_i$ values of 0 or 1 is $x=(-1,1,-,1)$.

As can be seen from the FIG. 1 and the accompanying description, it is understood that there is an image product Il formed for each of the m valid code words. For block codes (n,k) of n bits with k information bits (i.e., $2^k$ possible valid words) the system will require m×n analog multipliers to form the image products because n is the number of neurons and m equals $2^k$, the number of valid code words. For example, the block (7,4) code, there would be 112 multiplies ($2^7 \times 7$) required, or, 112 two-multiplicand multipliers. For a (15,7) code, there are 1920 ($2^7 \times 15$) multiplies.

The Minimum Operator

In order to simplify the electronics in implementing the high-order neural network model, the multiplication operator is replaced with a minimum operator, which functions to automatically generate an approximation of the image product comprising the lowest or "minimum" voltage to be multiplied. Since the multiplicands (neuron outputs) are bounded, i.e., all either a zero (0) or a one (1), and if the state of the system is not in the above-mentioned transition zone $T_e$, then the minimum operator may replace any multiplication circuitry. Any zero (0) multiplicand in the image product will make the whole image product zero. Further, if all the other multiplicands are one (1), the product will equal the non 1 value (minimum value). Even in the case where all but one multiplicands are close to one, the effect on the system dynamics is essentially the same. The minimum analog value can be found in parallel using simple diodes connected in reverse bias from the outputs of the state neuron amplifiers to a pulled-up node. Alternatively, any reversed biased device, e.g., transistor, SCR, etc., may be used as the minimum operator.

Figure 2:
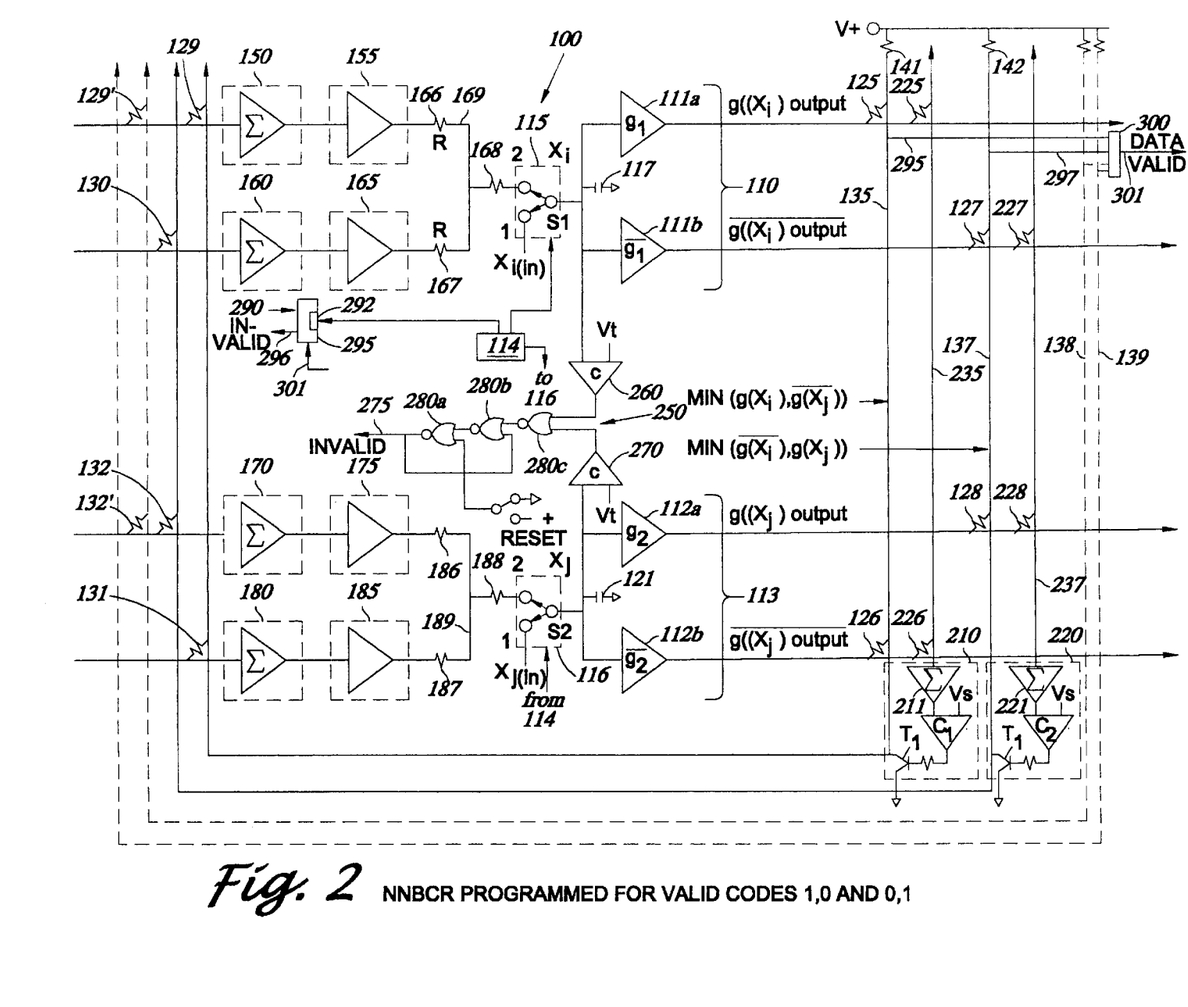
FIG. 2 is a schematic diagram of the neural network binary code recognizer 100 (NNBCR) of the instant invention.

FIG. 2 illustrates the preferred embodiment of the high-order neural network binary code recognizer 100 of the instant invention that is programmed to recognize two valid 2-bit code words $M_1=1,0$ and $M_2=0,1$. It should e understood that the system 100 described hereinbelow is an extremely simple (2 dimensional model and that the system is expandable for recognizing and decoding M binary code words each of n-bits (n-dimensional).

The two-dimensional NNCBR 100 programmed for recognizing valid code words of 2-bits each, comprises two neurons 110, 113, the first neuron 110 comprising non-inverting amplifier element 111a, indicated as $g_1$, and inverting amplifier comprising element 111b, indicated as $g_1$(not). The second neuron 113 comprises non-inverting amplifier element 112a, indicated as $g_2$, and inverting amplifier element 112b indicated as $g_2$(not). The outputs of the system are the voltages on capacitors 117 and 121, or, the outputs of $g_1,g_2$(not) and $g_2,g_2$(not).

Switches 115,116 are single pole, double throw switches that are provided for respective neurons 110, 113 for connecting the received analog inputs $x_{i(in)}$ and $x_{j(in)}$, representing the respective bits of coded digital word, into the system 100. Each switch 115,116 is initially in a respective first position 1 (indicated by broken lines) for inputting the analog voltages of bit values $x_{i(in)}$ and $x_{j(in)}$, respectively, into the system, and are timed by timing circuit 114 to switch to respective second positions 2 (indicated by the solid lines) to connect the respective inputs, indicated as $x_i$, $x_j$ to their feedback paths and allow the system 100 to stabilize as the outputs of the neuron amplifiers dynamically approach a stored valid memory word. Capacitor 117 of neuron 110 is provided to determine the time constant for the neuron 110 and the voltage thereof represents the state of the neuron. Likewise, capacitor 121 of neuron 113 determines the time constant for the neuron 113 of the system, and the voltage thereof represents the state of the neuron. Preferably, the switching time between the first positions and the second positions of each switch, 115, 116, as controlled by timing circuit 114, is chosen to enable respective capacitors 117 and 121 to sufficiently charge to their respective input voltage values. All timing circuit values are chosen so that the system time constant is compatible with slew rates of the rest of the circuit.

As mentioned previously, the system 100, as shown in FIG. 2, is configured to recognize two-bit valid code words. The mechanism for storing valid memory words (stable attractors) in the system is the same as generally described above with reference to FIG. 2. Namely, the two 2-bit memory words $M_1$, $M_2$ stored in the system are shown as reverse-biased diodes connecting the state neuron outputs with the inputs of the neurons. For instance, bit 1 (value=1) of valid word $M_1=(1,0)$ is stored by coupling reverse-biased diode 125 from the non-inverting output $g_1(x_i)$ of neuron 110, through feedback line 135 to resistor 129 coupled to summing amplifier 150 and amplifier 155, which, for reasons explained below, form the non-inverting input of the neuron 110. Bit 2 (value=0) of valid word $M_1=(1,0)$ is stored by coupling reverse-biased diode 126 from the inverting output $g_2(x_j)$ of neuron 113, through feedback line 135 to resistor 131 coupled to summing amplifier 180 and inverting amplifier 185, which, for reasons explained below, form the inverting input of the neuron 113.

Similarly, for storing bit 1 (value=0) of stored valid word $M_2$ (=0,1), a reverse-biased diode 127 couples the inverting output $g_1(x_i)$ (not) of neuron 110, through feedback line 137 to resistor 130 coupled to summing amplifier 160 and inverting amplifier 165, which, for reasons explained below, form the inverting input of the neuron 110. Likewise, bit 2 (value=1) of valid word $M_2=(0,1)$ is stored by coupling reverse-biased diode 128 from the non-inverting output $g_2(x_j)$ of neuron 113, through feedback line 137 to resistor 132 coupled to summing amplifier 170 and non-inverting amplifier 175, which, for reasons explained below, form the non-inverting input of the neuron 113. It should be understood that response characteristics of diodes 125–128 should be as closely matched as possible and that the values of resistors 129–131 are preferably of equal value.

As previously described with reference to Equations (1) and (2) above, an image product $I_m$, where m=1 or 2 is formed for each of the valid code words $M_1$, $M_2$, respectively. As described above, each image product is essentially a multiplication operator designed to function in accordance with equation (2) above. However, as described briefly above, each multiplier may be replaced with a minimum operator due to the fact that all neuron outputs are either a 0 or 1 during most of the operation of the device. Thus, the minimum orator for forming image product $I_1$ is implemented in system 100 as diodes 125,126 which couple the $g_1(x_i)$, $g_2(x_j)$(not) outputs of neurons 110,113, respectively, to the feedback line 135. Thus, the minimum voltage determined by the diodes 125,126 on feedback line 135 represents the image product $I_2$ is implemented in system 100 as diodes 127,128 which couple the $g_1(x_i)$ (not), $g_2(x_j)$ outputs of neurons 110,113, respectively, to the feedback line 137. Thus, the voltage on feedback line 137 represents the image product $I_2$ corresponding to the valid code word $M_2$. As shown in FIG. 2, each image product $I_1,I_2$ is connected with a voltage source $V^+$ by appropriate pull-up resistors 141,142 respectively. It is understood that diodes 125–128 functioning as the minimum orator, may be implemented as any reverse biased device, for e.g., transistor, SCR, and the like.

To accurately implement the dynamic memory model of the high order neural network governed by equation (1), it is required to feed the Image Products, e.g., $I_1, I_2$, back to the inputs of each state neuron in accordance with the bit value (0 or 1) of the code word $M_1$, $M_2$. In accordance with equation (1), the feedback term containing the image products form all the stored memories is the summation term:

$$\sum_{l=1}^{m} (2ml_i - 1) Il \quad (5)$$

where "i" is the number of the bit of the valid stored memory word. To implement this term in the system 100 shown in FIG. 2, the image product $I_1$, $I_2$ formed for valid memory codes $M_1$, $M_2$ are fed back to the neuron inputs of the appropriate polarity. For instance, image product $I_1$ is fed back to the $x_i$ input through resistor 129, summing amplifier 150, and amplifier 155, and, is fed back to the $x_j$ input through resistor 131, summing amplifier 180 and amplifier 185. Likewise, the Image product $I_2$ formed for valid memory code $M_2$ is fed back to the $x_i$ input through resistor 130, summing amplifier 160, and amplifier 165, and is also fed back to the $x_j$ input through resistor 132, summing amplifier 170, and amplifier 175. For neuron 110 corresponding to state $x_i$, amplifier 155 is a non-inverting amplifier and, with the appropriate gain, constitutes the non-inverting amplifier and constitutes the inverting input of the neuron. Likewise, for neuron 113 corresponding to state $x_j$, amplifier 175 is a non-inverting amplifier and constitutes the non-inverting input of the neuron and amplifier 185 is an inverting amplifier and constitutes the inverting input of the neuron. The stored bit of binary value 1 of image product $I_1$ is thus fedback to the non-inverting input of neuron 110 while the stored bit of binary value 0 of image product $I_2$ is fedback to the inverting input of neuron 113. The stored bit of binary value 0 of image product $I_2$ is fedback to the inverting input of neuron 110 and the stored bit of binary value 1 of image product $I_2$ is fedback to the non-inverting input of neuron 133.

It should be mentioned that in the preferred embodiment, each amplifier 155, 165, 175, and 185 has a gain of two for accommodating the two times division in each voltage divider network 169 formed by resistors 166, 167 and, voltage divider network 189 formed by resistors 186,187. Voltage divider networks 169 and 189 are provided for adding the results of the positive and negative feedback to each respective neuron 110 and 113. Since the binary code recognizer 100 is designed for the simple 2-dimensional case of recognizing only two, 2-bit code words, there is no other image product to be fed back to the summing amplifier 150. In an embodiment where it is desired to recognize additional two bit binary code words, for e.g., $M_3=(1,1)$ and $M_4=(0,0)$, it is necessary to form respective image products $I_3$, $I_4$ for each of these words and feed the image products back, for instance, on unused feedback lines 138 and 139 as indicated in FIG. 2, to their corresponding neuron inputs. Therefore, to store a valid code word $M_3=(1,1)$, the image product $I_3$ will be fed back on line 138 to summing amplifier 150 via resistor 129' and summing amplifier 170 via resistor 132', whereby both resistors are indicated as broken in FIG. 2.

For systems that recognize valid codes of higher dimensions, it is necessary to detect the case where many of the multiplicands involved in an image product are near zero. When this happens, the image product should be much smaller than the minimum multiplicand and a zero should be substituted for the minimum function. Thus, in such an embodiment an additional comparator circuit is added to the system which compares the sum of each of the multiplicands (neuron outputs) with a threshold voltage $V_s$. If the sum of the multiplicands, i.e., neuron outputs for each valid stored memory, is less than a threshold $V_s$, the image product is forced to a zero. If the sum is greater than a threshold $V_s$, the minimum multiplicand is used to approximate the image product. This is shown mathematically by equations (6)

$$\text{if } \sum_{j=1}^{n} (ml_j g(x_j) + (1 - ml_j)(1 - g(x_j))) \geq V_s, \quad (6)$$

$$\text{then } Il = \min_{j=1}^{n} (1 - ml_j g(x_j) + (1 - ml_j)(1 - g(x_j)));$$

$$\text{if } \sum_{j=1}^{n} (ml_j g(x_j) + (1 - ml_j)(1 - g(x_j))) < V_s,$$

$$\text{then } Il = 0;$$

Thus, in system 100 of FIG. 2, the neuron output voltage $g(x_i)$ through summing resistor 225 and neuron output voltage $g(x_j)$ (not) through summing resistor 226 are connected to feedback line 235 and the voltages are summed and compared by circuitry 210 comprising summation amplifier 211, and comparator $C_1$. Specifically, the resultant summed voltage at the neuron outputs 110, 113 for each stored word is compared with a threshold voltage $V_s$ typically of 60% to 80% of maximum volts $V^+$, by comparator circuits $C_1$ and $C_2$. If the summation is less than the threshold voltage $V_s$, the output of comparator $C_1$ remains high and image product $I_1$ on feedback line 135 is forced to zero volts by turning on transistor $T_1$. If the summation is greater than the threshold voltage $V_s$, the output of comparator $C_1$ goes low, turning $T_1$ off, and the image product $I_2$ on feedback line 135 becomes the minimum approximate of the image product $I_1$ as discussed above. Circuitry 220 is provided so that the neuron output voltage $g(x_i)$ (not) through summing resistor 227 and neuron output voltage $g(x_j)$ through summing resistor 228 are connected to feedback line 237 and the voltages are summed and compared by summation amplifier 221, and comparator $C_2$, respectively. Again, if the summation is less than the threshold voltage $V_s$, the output of comparator $C_2$, respectively. Again, if the summation is less than the threshold voltage $V_s$, the output of comparator $C_2$ remains high and image product $I_2$ on feedback line 137 is forced to zero volts by turning on transistor $T_2$. If the summation is greater than the threshold voltage $V_s$, the output of comparator $C_2$ goes low, turning $T_2$ off, and the image product $I_2$ on feedback line 137 becomes the minimum approximate of the image product $I_2$ as discussed above. It should be understood that the value of threshold voltage $V_s$ is chosen by design and is largely determined by the number of stored code word bits, the noise level in the circuit, the spacing difference between the stored memories, etc.

Figure 4:
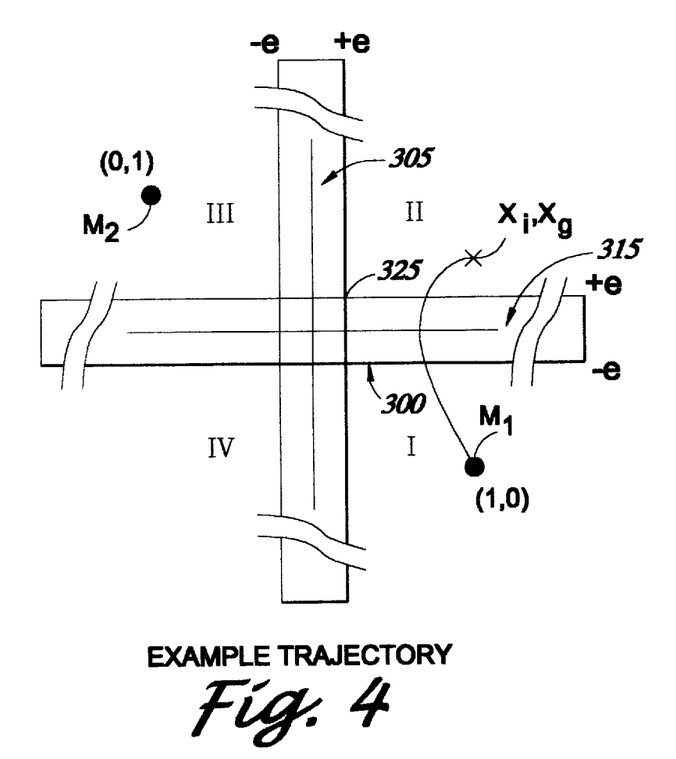
FIG. 4 illustrates an example trajectory of the NNCBR system converging to a memory given an initial input.

As mentioned above, FIG. 3 illustrates the linear ramp gain function for each neuron (amplifier), $g(x_i),g(x_j)$, and the neuron amplifier transition region bounded by values −e, +e. Functionally, as described above with respect to equation 3, the transition region is a region where the amplifier input $x_i$ or $x_j$ is of a value in a range $-e \leq x \leq e$, and the output $g(x)$ has not reached its steady state bounded output (binary 0 or 1). FIG. 4 is a two-dimensional state space diagram for the two neuron neural network 100 of the present invention showing the transition region 300 having a column component 305 where the neuron (e.g., 110) that determines the horizontal position of the system trajectory (e.g., $x_i$) is in transition, and a row component 315 where the neuron (e.g., 133) that determines the vertical position of the system trajectory (e.g., $x_j$) is in transition. The dark shaded region 325 at the origin, is the region where both $x_i$ and $x_j$ are both in transition.

As illustrated in FIG. 4, the stored valid memory words $M_1$ (=1,0) and $M_2$(=0,1) reside in a two-dimensional space with word $M_1$ residing in orthant labelled I and word $M_2$ residing in orthant labelled III. When the analog inputs $x_i$ and $x_j$ representing a digitally encoded word are input to the system 100 and have values which place it in the same orthant where a valid (prestored) memory word $M_1$, $M_2$ resides, the system trajectory is such that the neuron outputs will dynamically approach the nearest stored word (stable attractor) residing in that orthant.

It may be the case that the received analog inputs, $x_i$ and $x_j$, are of values which place it in an orthant not having a valid prestored memory word. For instance, as shown in FIG. 4, the initial input labelled "x" $(x_i, x_j)$ are of voltages having values which place it in orthant labelled II. In such case, all image products, $I_1$ and $I_2$ are zero due to the minimum operator, and the system state $(x_i$ and $x_j)$ decays toward the origin (both state capacitors 117,121 in FIG. 2 are discharged and decay to ground). As the state voltages decay, however, they will reach a transition region and cross into the row component 315 of the transition region 300. This component dictates the vertical trajectory of the system and causes the image product $I_1$ corresponding to code (1,0) to grow from zero to one. This growing image product results in a positive feedback effect which drives the neuron amplifier $g_2$(not) more negative causing the system to accelerate downward and to the right toward orthant I resulting in a curve in the trajectory toward memory $M_1$ (=1,0). Generally, whichever component of the transition region is crossed first will dictate the trajectory of the system.

In the case of symmetry, where the input $x_i$, $x_j$ equidistant from more than one valid code (memory), there is no correct answer and the system trajectory will pass through the origin (or get stuck at the origin). To detect such an occurrence, as shown in FIG. 2, the system 100 is provided with monitoring circuitry 250 that includes comparator circuits 260 and 270 connected with inputs $x_i$ and $x_j$, respectively, that will output a logic 0 when $x_i$ or $x_j$ are of voltages within some threshold voltage $+/-V_t$ of the origin. In the preferred embodiment, the voltage threshold $V_+$ that the inputs $x_i$ and $x_j$ are compared, $+/-e$ volts.

Additionally, a signal 275 indicating that an answer can not be found (due to symmetry) is produced by latching circuitry 276, which is provided to detect when the comparators 260, 270 have simultaneously output a logic 0. Latching circuitry may include NOR gates 280a,b,c that are connected to the outputs of the comparators 260, 270 in a latching configuration. The comparators can be adjusted to detect an arbitrarily close-to-the-origin trajectory so that NNBCR results can also have a controllable confidence interval.

It should be understood that the closer the analog code inputs are to a stored valid memory word, the shorter the time for system convergence. Thus, an alternate means for determining whether or not a valid code word is recognized is to compare the time it takes for the image products to converge, i.e., reach a stable attractor, with a predetermined time threshold. As shown in FIG. 2, when the time circuit 114 switches the received signals $x_i$(in) and $x_j$(in) into the system 100, it simultaneously triggers counter/timer circuitry 290, which may comprise a clock circuit 292 and counter circuit 293, for counter (up or down) the time it takes for the system 100 to converge. If the system does not converge in a predetermined time as programmed within the timer circuit 290, a data invalid signal 296 will be generated, indicating that the system did not converge possibly due to symmetry. The programmed time limit will vary in accordance with the (code word) bit amount.

As shown in FIG. 2, the image product that is generated on feedback lines 136 and 137 after the timer 114 switches the received signals $x_i$(in) and $x_j$(in) into the system 100, is connected via lines 295 and 297, respectively, to additional logic circuitry 299. This logic circuit 299 will generate a data valid signal 301 when a valid code word has been detected (system converged). Logic circuitry 299 is able to detect that data is valid at the time when exactly one image product is maximally activated, i.e., when the state of the system is in the correct orthant and outside of the transition region. This data valid word may be input to the timer/counter circuit 290 as shown in FIG. 2, to stop or reset the counter/timer 290 (that has been simultaneously triggered by switch 114) if the system converges before the programmed timer times out. If the generated image product output on lines 135 and 137, converges, then the timer 290 will stop and the data invalid output signal 296 will not toggle. If the generated image product output on lines 135 and 137 do not converge, then the counter/timer circuitry will time out first and the data invalid signal 296 will toggle, indicating no valid data has been received.

Figure 5A:
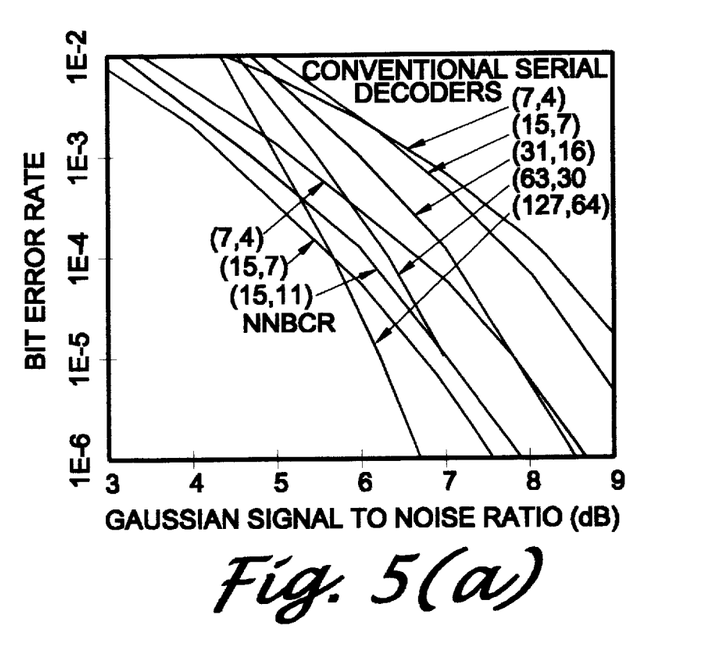
FIGS. 5(a) and 5(b) illustrate the results of comparisons using the digital decoding technique of the NNBCR of the instant invention as compared with conventional serial decoders.
Figure 5B:
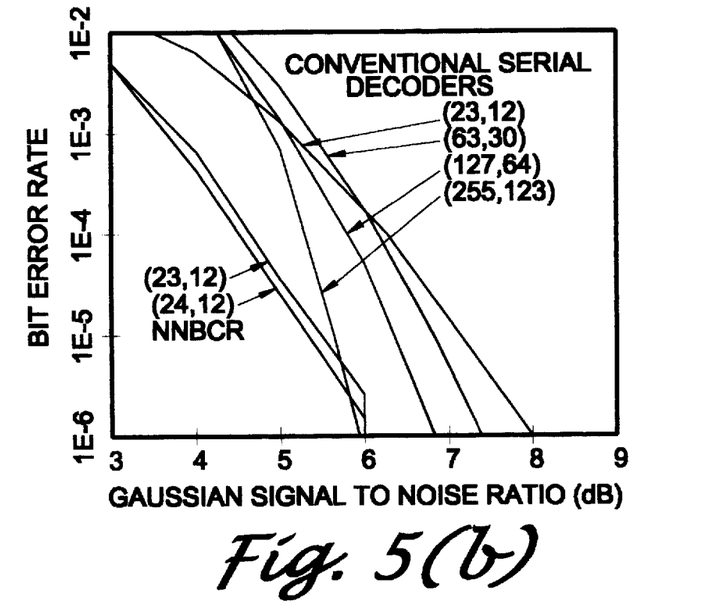

The preferred embodiments of the neural network binary code recognizer 100 of the instant invention will lower the error rate for the typical error correction code systems according to the curves in FIGS. 5(a) and 5(b). This can mean one to three orders of magnitude less error for typical applications or a significant reduction in the number of transmitted bits required for a given error rate.

As shown in FIG. 5(a), for example, given a Gaussian SNR of 5.6 dB and a (15,7) code, the NNBCR has a bit error rate of 1 error in 10,000 transmissions compared with the conventional serial decoder's error rate of 1 error in about 900 transmissions.

Nonrecurrent Binary Code Recognizer

Figure 6:
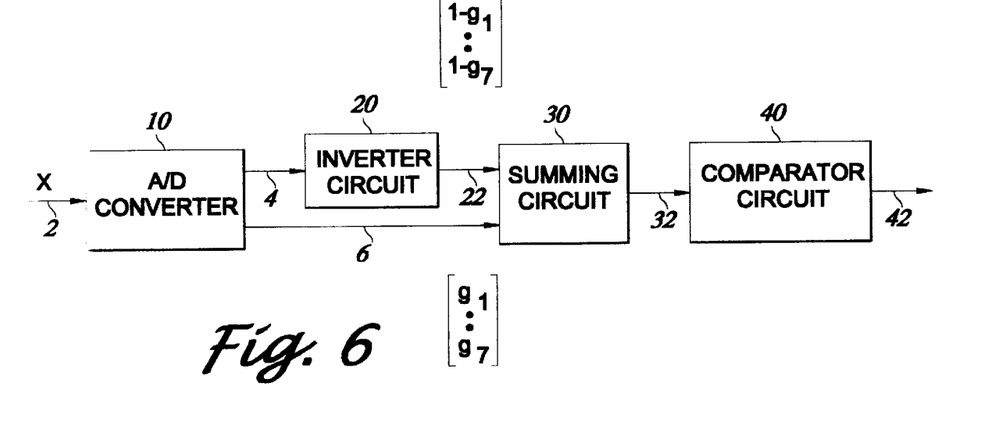
FIG. 6 is a schematic diagram of the nonrecurrent binary code recognizer (NBCR) of the present invention.

The nonrecurrent binary code recognizer (NBCR) of the present invention is illustrated in FIG. 6 which depicts a presently preferred embodiment thereof. The NBCR decodes a vector of n analog components, which is a binary word of n bits distorted by a random process, into a decoded binary word of n bits, the decoded binary word of n bits being from a list of m predetermined valid binary words. The NBCR is comprised generally of an analog-to-digital converter 10, an inverter circuit 20, a digital summing circuit 30 and a comparator circuit 40. The analog-to-digital converter 10 transforms an input vector x of n analog components into an ordered set $\{g_i, i=1, \ldots, n\}$ of n digital values of a gain function g(x) which provides a quantization of the n analog components. The inverter circuit 20, in electrical communication with the analog-to-digital converter 10, transforms the ordered set $\{g_i, i=1, \ldots, n\}$ of the n digital values of the gain function into an ordered set of n Boolean complements of the n digital values of the gain function, i.e., the set $\{1-g_i, i=1, \ldots, n\}$. The digital summing circuit 30, in electrical communication with the analog-to-digital converter 10 and with the inverter circuit 20, combines selected elements from the group consisting of first elements of the ordered set $\{g_i, i=1, \ldots, n\}$ and second elements of the ordered set $\{1-g_i, i=1, \ldots, n\}$ into m code patterns. Each of the m code patterns represents a distinct predetermined valid binary word of n bits in the list of m predetermined valid binary words. The digital summing circuit 30 adds the selected elements in each of the m code patterns to form a sum value for each code pattern. The comparator circuit 40 in electrical communication with the digital summing circuit 30 compares the m sum values with each other and outputs the largest sum value at output 42. The code pattern which results in the largest sum value corresponds to the decoded binary word of n bits.

The following example illustrates how the NBCR decodes the Hamming (7,4) code. Hamming (7,4) code has $2^4=16$ valid code words among $2^7=128$ possible binary words of 7 bits each. It is important to note, however, that any code (n,k), with k<n, with word length n and $2^k$ code words chosen among the $2^n$ binary n-bit words can be decoded by the NBCR.

In FIG. 6, a transmitted binary word of seven bits distorted by additive noise in the communication channel arrives as a real-valued vector x, that is, a vector of seven analog components. The real vector x is fed to input 2 of the analog-to-digital (A/D) converter 10.

The A/D converter 10 transforms each analog component of vector x into a digital value of a gain function g(x). For this example, a 4-bit accuracy is used for the digital values of the gain function g(x). Any other level of accuracy is possible, but integrated circuit design favors four-bit technology. The A/D converter gain function g(x) has the fractional digital value 0.0000 in binary for any input less than or equal to the normalized analog input −1 and fractional digital value 0.1111 for any input greater than or equal to the normalized analog input +1. The gain function g(x) can be a discrete bounded ramp function or a discrete bounded sigmoid function.

Figure 7:
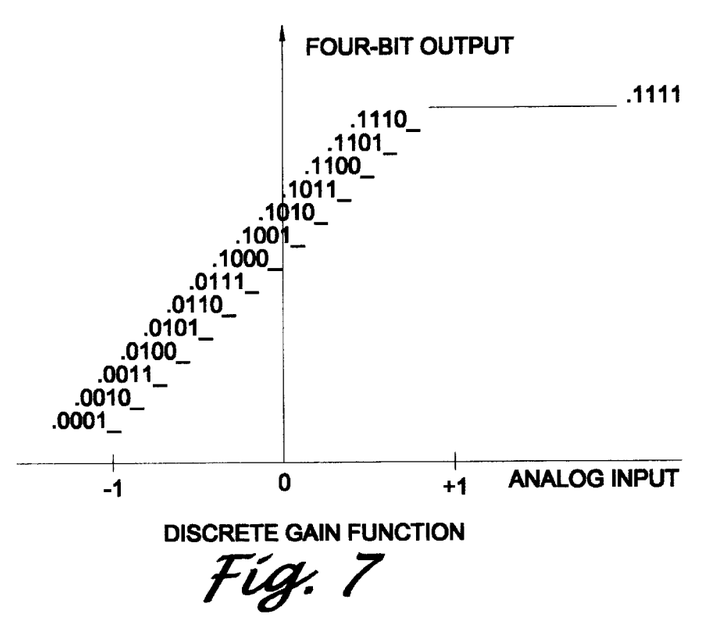
FIG. 7 illustrates an example of the discrete gain function.

FIG. 7 illustrates an example of g(x) as a discrete bounded ramp function. With 4-bit accuracy, the gain function g(x) as a discrete bounded ramp function has 16 step levels. It should be emphasized that the exact placement of the steps of the gain function g(x) is not crucial to the performance of the NBCR. But the symmetry of the step level corresponding to an analog input value of zero is needed. Such symmetry of that step level has been observed to enhance accuracy of the decoder. FIG. 7 shows that a slight asymmetry in the discrete ramp allows the step level of value 0.1000 to be symmetric relative to analog input zero even though the number of step levels is even. An expression for the gain function g(x) is g(x)=[int{(N−1)*(x+e)/2e}+1]/N for −e≦x≦e, where e=1 and N=number of step levels=16 for the present example. For example, g(0)=0.5 is represented by the fractional digital value 0.1000 with 4-bit accuracy.

The output of the A/D converter is a set of 7 digital values of the gain function, $\{g_i, i=1, \ldots, 7\}$. The set $\{g_i, i=1, \ldots, 7\}$ is fed as input 4 to the inverter circuit 20 and as input 6 to the summing circuit 30. The inverter circuit 20 transforms the set $\{g_i, i=1, \ldots, 7\}$ into the set of corresponding Boolean complements, i.e., the set $\{1-g_i, i=1, \ldots, 7\}$. The set $\{1-g_i, i=1, \ldots, 7\}$ is fed as input 22 to the summing circuit 30.

The summing circuit 30 combines, according to the formula indicated below, selected elements from the group consisting of elements of the set $\{g_i, i=1, \ldots, 7\}$ and of elements of the set $\{1-g_i, i=1, \ldots, 7\}$ into 16 code patterns. Each code pattern represents a distinct predetermined valid binary code word of 7 bits. There are 16 predetermined valid binary code words which are the 16 valid code words in Hamming (7,4) code. The formula for forming a code pattern is the following: given a valid code word, each bit value of 1 at position i in the valid code word is represented by $g_i$ in the code pattern and each bit value of 0 at position j in the valid code word is represented by $1-g_j$ in the code pattern. For example, the corresponding code pattern to code word 1101100, a valid code word in Hamming (7,4) code, is $\{g_1, g_2, 1-g_3, g_4, g_5, 1-g_6, 1-g_7\}$. Since there are 16 valid code words in Hamming (7,4) code, there are 16 corresponding code patterns. For each code pattern, the summing circuit 30 adds the elements of the code pattern and outputs a sum value. Since there 16 code patterns, there are 16 corresponding sum values.

Figure 8:
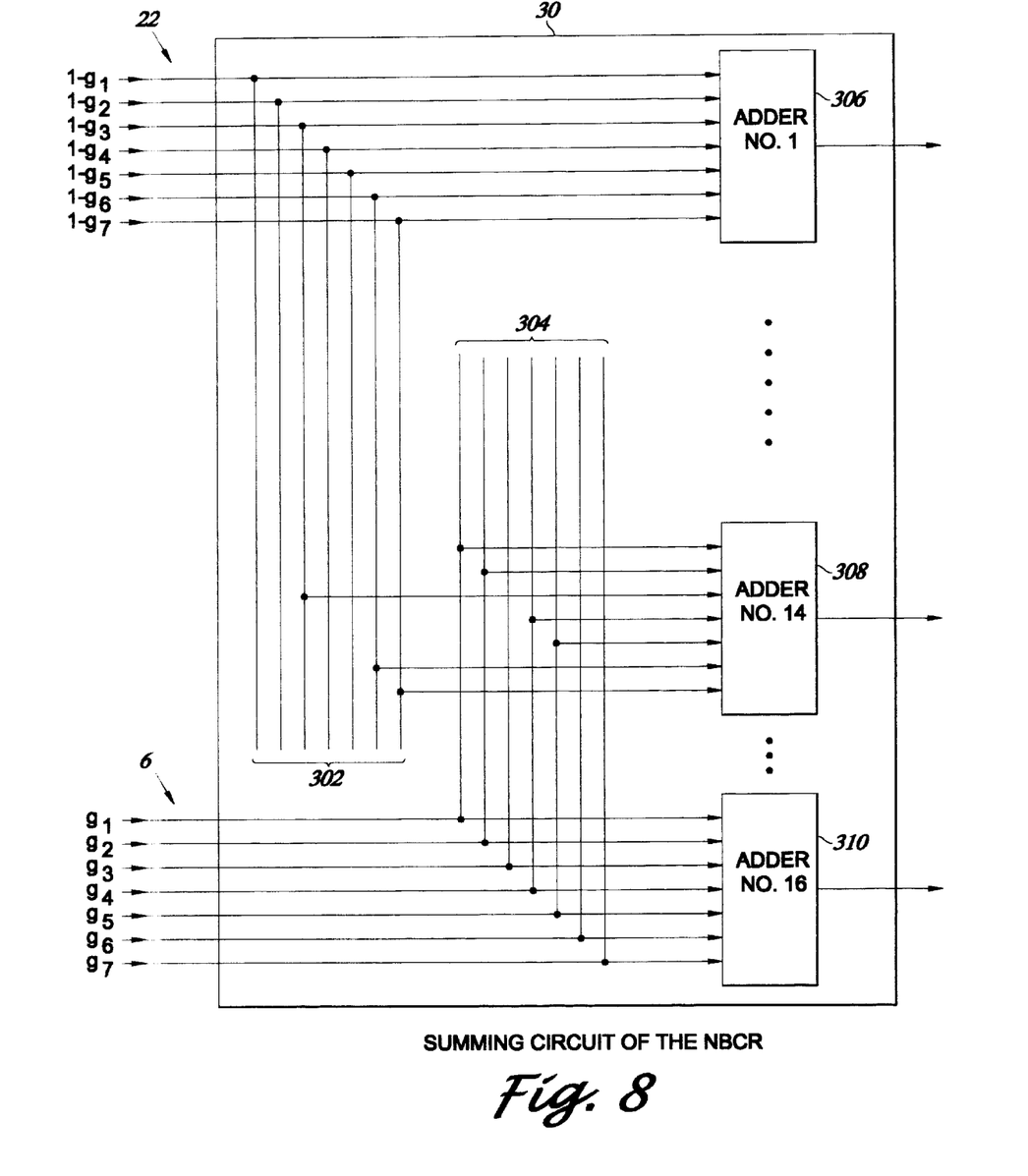
FIG. 8 illustrates a detailed example of the summing circuit of the nonrecurrent binary code recognizer (NBCR).

The summing circuit 30 can be implemented with 16 seven-input adders. To illustrate, only three of the 16 seven-input adders are shown in FIG. 8. In FIG. 8, the 4-bit signals $\{1-g_i, i=1, \ldots, 7\}$ arrive at input 22 of the summing circuit 30. The 4-bit signals $\{g_i, i=1, \ldots, 7\}$ arrive at input 6 of the summing circuit 30. The bus 302 makes the signals $\{1-g_i, i=1, \ldots, 7\}$ available to all the adders. Similarly, the bus 304 makes the signals $\{g_i, i=1, \ldots, 7\}$ available to all the adders. Adder No. 1 306 receives the 4-bit signals $\{1-g_1, 1-g_2, 1-g_3, 1-g_4, 1-g_5, 1-g_6, 1-g_7\}$ which is the code pattern corresponding to the valid code word 0000000 and outputs a 7-bit sum value. Adder No. 14 308 receives the 4-bit signals $\{g_1, g_2, 1-g_3, g_4, g_5, 1-g_6, 1-g_7\}$ which is the code pattern corresponding to the valid code word 1101100 and outputs a 7-bit sum value. Adder No. 16 310 receives the 4-bit signals $\{g_1, g_2, g_3, g_4, g_5, g_6, g_7\}$ which is the code pattern corresponding to the valid code word 1111111 and outputs a 7-bit sum value.

Referring to FIG. 6, the 16 sum values are outputted from the summing circuit 30 and inputted into the comparator circuit 40 via input 32. The comparator circuit 40 compares the 16 sum values with each other and outputs the largest sum value at output 42. The code pattern which results in this largest sum value is then found from a look-up table and the predetermined valid binary code word corresponding to this code pattern is outputted as the decoded binary code word.

In terms of an integrated circuit (IC) implementation, the NBCR comprises mainly of adders and comparators. For the present example, the NBCR comprises 16 adders, each of which adds up seven 4-bit numbers.

Instead of comprising 16 seven-input adders, the summing circuit 30 may also be implemented with 16 parallel pipelines of two-input adders, each pipeline comprising three stages, to achieve maximum throughput. For example, consider the valid code word 1101100 in Hamming (7,4) code. The corresponding code pattern to code word 1101100 is $\{g_1, g_2, 1-g_3, g_4, g_5, 1-g_6, 1-g_7\}$. The seven elements of this code pattern are 4-bit numbers. In the summing circuit, the sums $g_1+g_2$, $(1-g_3)+g_4$ and $g_5+(1-g_6)$ are added in parallel using three 2-input adders, resulting in three 5-bit numbers. Each of the resulting 5-bit numbers is latched to the second stage of the pipeline using a register. The last element $(1-g_7)$ of the code pattern, which does not have a partner to be added to, is simply latched to the second stage of the pipeline. At the second stage of the pipeline, the three 5-bit numbers and the 4-bit number $(1-g_7)$ are added in pairs using two 2-input adders, resulting in two 6-bit numbers. Each of the two resulting 6-bit numbers is latched to the final pipeline stage using a register. At the third and last stage of the adder pipeline, the two 6-bit numbers are added using a two-input adder which outputs a 7-bit sum value. Since there are 16 valid code words in Hamming (7,4) code and there is a 7-bit sum value for each code word, the summing circuit 30 comprises 16 parallel adder pipelines and outputs a total of sixteen 7-bit sum values simultaneously.

The comparator circuit 40 may also be implemented in pipeline stages to achieve maximum throughput. For the present example, the comparator circuit 40 comprises four comparator stages. The first comparator stage receives sixteen 7-bit sum values from the summing circuit 30 and compares them in pairs using eight two-input comparators and outputs eight intermediate maximum values. These eight values are then latched to the second comparator stage which compares them in pairs using four 2-input comparators and outputs four maximum values. These four values are then latched to the third comparator stage which compares them in pairs using two 2-input comparators and outputs two maximum values. These two values are then latched to the last comparator stage which compares them using one 2-input comparator. This final comparison results in the output of the largest 7-bit sum value. The code pattern which results in this largest sum value is then found from a look-up table and the predetermined valid binary code word corresponding to this code pattern is outputted as the decoded binary code word.

This pipeline implementation allows new seven 4-bit numbers, i.e., 28 bits, to be accepted at the inputs of each of the 16 parallel pipelines of the summing circuit 30 at every clock cycle and a new seven-bit number to appear at the output of the comparator circuit 40 at every clock cycle. The slowest elements in the entire pipeline system are the six-bit adders at the 16 final parallel adder pipeline stages. Therefore, the clock speed is only limited by this delay. Each set of sixteen 28-bit inputs requires 7 clock cycles to be processed, that is, 3 clock cycles for each parallel adder pipeline and 4 for the comparator pipeline. This implementation assumes that all 28 bits are available simultaneously at the input of each of the 16 parallel adder pipelines of the summing circuit 30. The summing circuit 30 may also be implemented with accumulator-based adders if the incoming data are received one symbol at a time.

In general, for a binary block code (n,k) having code words of length n and $2^k$ code words, a NBCR with pipeline implementation of the summing circuit 30 and the comparator circuit 40 requires a number of clock cycles equal to k plus the smallest integer at least as large as $\log_2$ n. For example, a NBCR decoder for the block code (18,8) requires 8+5=13 clock cycles.

Figure 9:
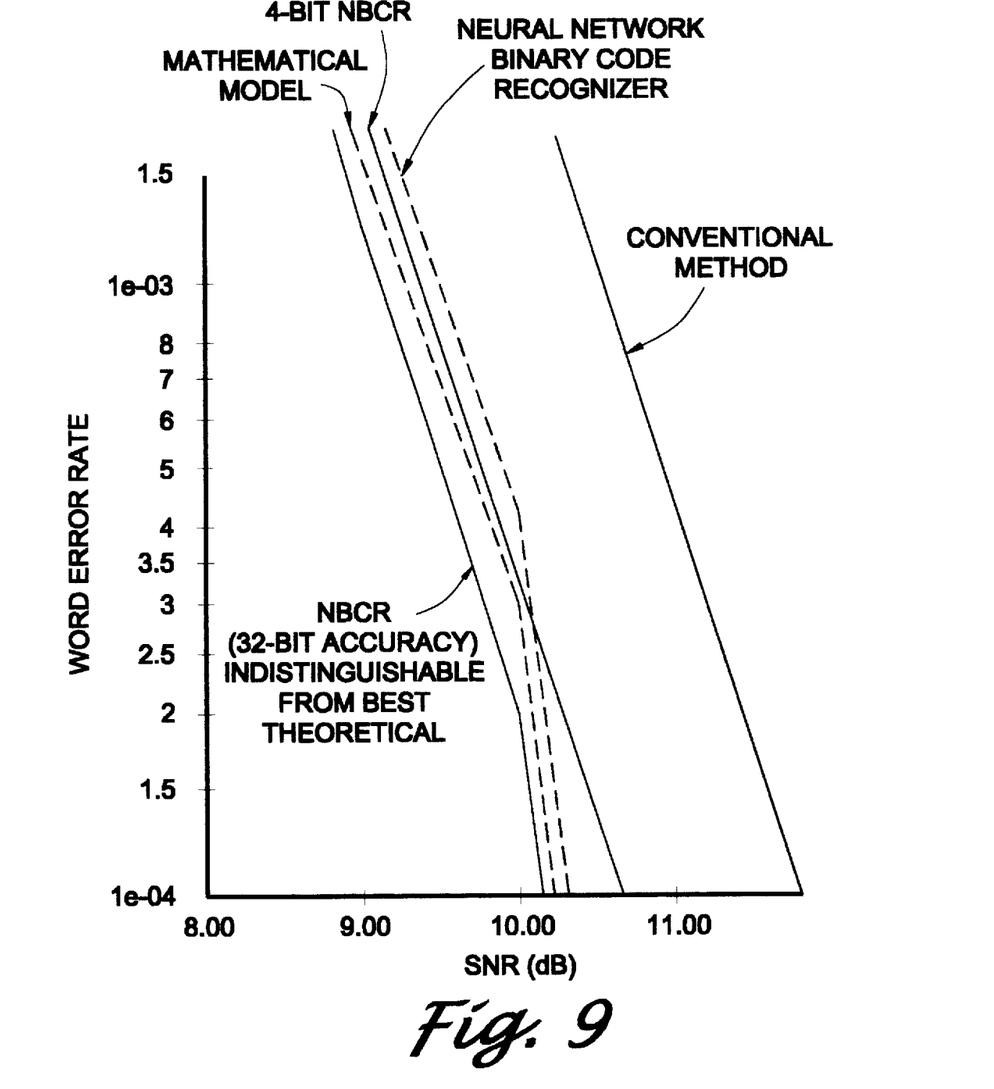
FIGS. 9 and 10 illustrate the performance of the NBCR as compared to the NNBCR and conventional method at different signal-to-noise ratios.
Figure 10:
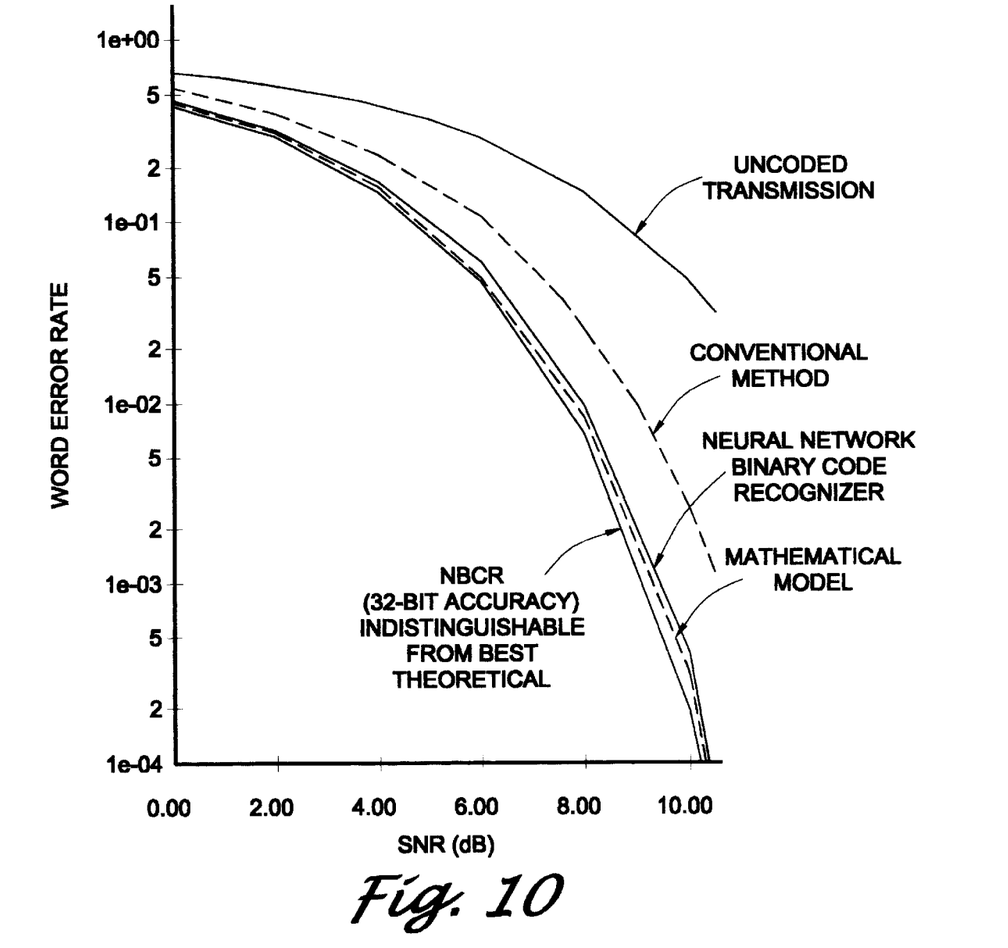

The performance of the NBCR in simulation, at different signal-to-noise ratios, as compared to the Neural Network Binary Code Recognizer (NNBCR) and the conventional method are illustrated in FIGS. 9 and 10. FIGS. 9 and 10 show that, as far as we can presently determine, even with 4-bit accuracy for the A/D converter gain function, the NBCR provides an error rate of one to three orders of magnitude lower than an error rate obtained with a conventional hard decision decoder. Compared to the NNBCR, the 4-bit accuracy NBCR appears to have a lower error rate for signal-to-noise ratios of less than 10 dB. With 32-bit accuracy for the gain function, the NBCR is presently assessed to perform better than the mathematical neural network model described above in the section "Background of the invention". With 32-bit accuracy for the gain function, as presently determined, the NBCR performance is indistinguishable from that of the best theoretical method which is the Euclidean nearest neighbor method.

Although shown and described in what we believed to be the most practical and preferred embodiments, it is apparent that departures from the specific methods and designs described and shown will suggest themselves to those skilled in the art and may be made without departing from the spirit and scope of the invention. For instance, the neural network binary code recognizer of FIG. 2 may be n-dimensional and designed to recognize m code words of n-bits each. Similarly, the nonrecurrent binary code recognizer of FIG. 6 may be designed to recognize m code words of length n bits each. We, therefore, do not wish to restrict ourselves to the particular constructions described and illustrated, but desire to avail ourselves of all modifications that may fall within the scope of the appended claims.

What is claimed is:

1. A method for decoding a vector of n analog components into a decoded binary word of n bits, the decoded binary word of n bits being from a list of m predetermined valid binary words, the vector of n analog components being a binary word of n bits distorted by a random process, the method comprising the steps of:

(a) transforming said vector of n analog components into an ordered set of n digital values of a gain function, the gain function providing a quantization of the n analog components;

(b) inverting the ordered set of the n digital values of the gain function into an ordered set of n Boolean complements of said n digital values of the gain function;

(c) combining, into m code patterns, selected elements from the group consisting of first elements of the ordered set of the n digital values of the gain function and second elements of the ordered set of the n Boolean complements of said n digital values of the gain function, each of the m code patterns corresponding to a predetermined valid binary word in the list of m predetermined valid binary words;

(d) computing m sum values, each of the m sum values representing a total value of the selected elements in one of the m code patterns, each sum value being associated with one of the m code patterns; and (e) comparing the m sum values to determine a sum value of interest in accordance with a predetermined criterion, the sum value of interest being associated with one of the m code patterns corresponding to the decoded binary word of n bits.

2. The method as recited in claim 1 wherein step (c) comprises selecting element $g_i$ of $\{g_i, i=1, \ldots, n\}$, $\{g_i, i=1, \ldots, n\}$ being the ordered set of the n digital values of the gain function, if a corresponding bit at position i in a predetermined valid binary word is one and selecting element $1-g_i$ of $\{1-g_i, i=1, \ldots, n\}$, $\{1-g_i, i=1, \ldots, n\}$ being the ordered set of the n Boolean complements of said n digital values of the gain function, if a corresponding bit at position i in a predetermined valid binary word is zero.

3. The method as recited in claim 1 wherein step (e) comprises comparing the m sum values to determine a largest sum value.

4. The method as recited in claim 1 wherein the gain function is a discrete bounded ramp function.

5. The method as recited in claim 1 wherein the gain function is a discrete bounded ramp function comprising a step level symmetric with respect to an input analog component value of zero.

6. The method as recited in claim 1 wherein the gain function is a discrete bounded sigmoid function.

7. The method as recited in claim 1 wherein the gain function is a discrete bounded sigmoid function comprising a step level symmetric with respect to an input analog component value of zero.

8. The method as recited in claim 1 wherein step (d) comprises computing each of the m sum values in pipeline stages, outputs of a pipeline stage being latched from the pipeline stage to a next pipeline stage.

9. The method as recited in claim 1 wherein step (e) comprises comparing the m sum values in pipeline stages and determining a largest sum value at a last pipeline stage.

10. A system for decoding a vector of n analog components into a decoded binary word of n bits, the decoded binary word of n bits being from a list of m predetermined valid binary words, the vector of n analog components being a binary word of n bits distorted by a random process, the system comprising:

(a) an analog-to-digital converter for transforming said vector of n analog components into an ordered set of n digital values of a gain function, the gain function providing a quantization of the n analog components;

(b) an inverter circuit in electrical communication with the analog-to-digital converter for transforming the ordered set of the n digital values of the gain function into an ordered set of n Boolean complements of said n digital values of the gain function;

(c) a digital summing circuit in electrical communication with the analog-to-digital converter and with the inverter circuit for combining m code patterns into m sum values, each of the m code patterns comprising selected elements from the group consisting of first elements of the ordered set of the n digital values of the gain function and second elements of the ordered set of the n Boolean complements of said n digital values of the gain function, each of the m code patterns corresponding to a predetermined valid binary word of n bits in the list of m predetermined valid binary words, each of the m sum values representing a total value of the selected elements in one of the m code patterns, each of the m sum values being associated with one of the m code patterns; and (d) a comparator circuit in electrical communication with the digital summing circuit for determining from the m sum values a sum value of interest in accordance with a predetermined criterion, the sum value of interest being associated with one of the m code patterns corresponding to the decoded binary word of n bits.

11. The system as recited in claim 10 wherein the digital summing circuit comprises selecting element $g_i$ of $\{g_i, i=1, \ldots, n\}$, $\{g_i, i=1, \ldots n\}$ being the ordered set of the n digital values of the gain function, if a corresponding bit at position i in a predetermined valid binary word is one and selecting element $1-g_i$ of $\{1-g_i, i=1, \ldots, n\}$, $\{1-g_i, i=1, \ldots n\}$ being the ordered set of the n Boolean complements of said n digital values of the gain function, if a corresponding bit at position i in a predetermined valid binary word is zero.

12. The system as recited in claim 10 wherein the comparator circuit determines a largest sum value from the m sum values.

13. The system as recited in claim 10 wherein the gain function is a discrete bounded ramp function.

14. The system as recited in claim 10 wherein the gain function is a discrete bounded ramp function comprising a step level symmetric relative to an input analog component value of zero.

15. The system as recited in claim 10 wherein the gain function is a discrete bounded sigmoid function.

16. The system as recited in claim 10 wherein the gain function is a discrete bounded sigmoid function comprising a step level symmetric relative to an input analog component value of zero.

17. The system as recited in claim 10 wherein the digital summing circuit for combining m code patterns into m sum values comprises a plurality of digital adders.

18. The system as recited in claim 10 wherein the comparator circuit for determining a sum value of interest from the m sum values comprises a plurality of comparators.

19. The system as recited in claim 10 wherein the digital summing circuit comprises a plurality of digital adders connected in pipeline stages, outputs of digital adders at each pipeline stage being latched to a next pipeline stage.

20. The system as recited in claim 10 wherein the comparators are connected in pipeline stages, outputs of comparators at each pipeline stage being latched to a next pipeline stage.

* * * * *